(12) United States Patent
Rosman et al.

(10) Patent No.: US 8,195,003 B2
(45) Date of Patent: Jun. 5, 2012

(54) METHOD OF CORRECTING DIGITAL IMAGE DISTORTION CAUSED BY A SHEET-FED SCANNER

(75) Inventors: Guy Rosman, Haifa (IL); Doron Tal, Haifa (IL); Asaf Tzadok, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 12/164,134

(22) Filed: Jun. 30, 2008

(65) Prior Publication Data

US 2009/0324119 A1 Dec. 31, 2009

(51) Int. Cl.
*G06K 9/40* (2006.01)

(52) U.S. Cl. ........................... 382/275; 382/255

(58) Field of Classification Search .................. 382/173, 382/175, 176, 177, 180, 209, 217, 218, 255, 382/275
See application file for complete search history.

(56) References Cited

U.S. PATENT DOCUMENTS

| | | | |
|---|---|---|---|
| 5,308,991 A * | 5/1994 | Kaplan | 250/492.22 |
| 6,539,112 B1 | 3/2003 | Smith | |
| 6,658,166 B1 | 12/2003 | Zlotnick et al. | |
| 7,330,604 B2 * | 2/2008 | Wu et al. | 382/289 |
| 7,593,595 B2 * | 9/2009 | Heaney et al. | 382/276 |

FOREIGN PATENT DOCUMENTS

EP 0923044 B1 12/2003

OTHER PUBLICATIONS

Guy Rosman et al., "A New Physically Motivated Warping Model for Form Drop-Out", International Conference on Document Analysis and Recognition", 2007", 774-778, Sep. 23, 2007.

* cited by examiner

*Primary Examiner* — Yon Couso
(74) *Attorney, Agent, or Firm* — Howie Zaretsky (57) ABSTRACT

A novel and useful method of processing digital images to correct distortion caused by a sheet-fed scanner. The method of the present invention derives a model which estimates the distortion. Match points are detected in the digital image and compared to match points of pre-defined templates. Treating the relative locations of the detected match points as polar coordinates (as opposed to Cartesian coordinates) enables a model to be derived to correct the distortion. In the event that there are multiple distortions to the digital image the digital image is partitioned into segments, with a separate model derived for each segment.

25 Claims, 5 Drawing Sheets

METHOD OF CORRECTING DIGITAL IMAGE DISTORTION CAUSED BY A SHEET-FED SCANNER

FIELD OF THE INVENTION

The present invention relates to the field of digital image processing, and more particularly relates to a method of correcting digital image distortion caused by a sheet-fed scanner.

SUMMARY OF THE INVENTION

There is thus provided in accordance with the invention, a method of correcting distortion in a digital image, the method comprising the steps of creating a plurality of document templates, matching said digital image to one of said document templates, identifying one or more segments, wherein each segment comprises a separate distortion events in said distorted digital image, computing a formula representing each said separate distortion event and correcting said distorted digital image by applying each said formula to its associated segment.

There is also provided a accordance of the invention, a method of creating a document template from a digital image, the method comprising the steps of identifying a plurality of unique components of said digital image and determining the relative location of each said unique component in respect to one or more other said unique components in said digital image.

There is further provided a method of matching a document template to a distorted digital image, the method comprising the steps of creating a plurality of document templates, associating said distorted digital image to one of said document templates, identifying one or more segments in said distorted digital image, wherein each segment comprises a separate distortion event, establishing one or more segments in said associated document template, wherein each established segment corresponds to an identified segment in said distorted digital image, computing a formula representing each said distortion event and distorting said associated document template by applying each said formula to its corresponding segment in said associated document template.

There is further provided a computer program product for correcting distortion in a digital image, the computer program product comprising a computer usable medium having computer usable code embodied therewith, the computer program product comprising computer usable code configured for computer usable code configured for creating a plurality of document templates, computer usable code configured for matching said digital image to one of said document templates, computer usable code configured for identifying one or more segments, wherein each segment comprises a separate distortion events in said distorted digital image, computer usable code configured for computing a formula representing each said separate distortion event and computer usable code configured for correcting said distorted digital image by applying each said formula to its associated segment.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document:

| Term | Definition |
| --- | --- |
| ASIC | Application Specific Integrated Circuit |
| CD-ROM | Compact Disc Read Only Memory |
| CPU | Central Processing Unit |
| DSP | Digital Signal Processor |
| EEROM | Electrically Erasable Read Only Memory |
| EPROM | Erasable Programmable Read-Only Memory |
| FPGA | Field Programmable Gate Array |
| FTP | File Transfer Protocol |
| HTTP | Hyper-Text Transport Protocol |
| I/O | Input/Output |
| LAN | Local Area Network |
| NIC | Network Interface Card |
| RAM | Random Access Memory |
| RF | Radio Frequency |
| ROM | Read Only Memory |
| WAN | Wide Area Network |

Detailed Description of the Invention

The present invention is a method of processing digital images to correct distortion caused by a sheet-fed scanner by deriving a model which estimates the distortion. Match points are detected in the digital image and compared to match points of pre-defined templates. Treating the relative locations of the detected match points as polar coordinates (as opposed to Cartesian coordinates) enables a model to be derived to correct the distortion. In the event that there are multiple distortions to the digital image the digital image is partitioned into segments, with a separate model derived for each segment.

In one embodiment of the present invention, a model is applied to each segment of the digital image, thereby correcting the distortion in the digital image in order to match one of the pre-defined templates. In a second embodiment of the present invention, a model is applied to each segment of a pre-defined template. Applying a model to each segment of the template will mirror the distortion in the digital image, enabling identification of a match between the digital image and a pre-defined template.

One example application of the invention is to facilitate the development of tools to correct a digital image scanned in by sheet-fed scanner, where the velocity of each side of the paper was different as the document was fed to the scanner. Automated digital image correction using the method of the present invention will increase scan accuracy.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
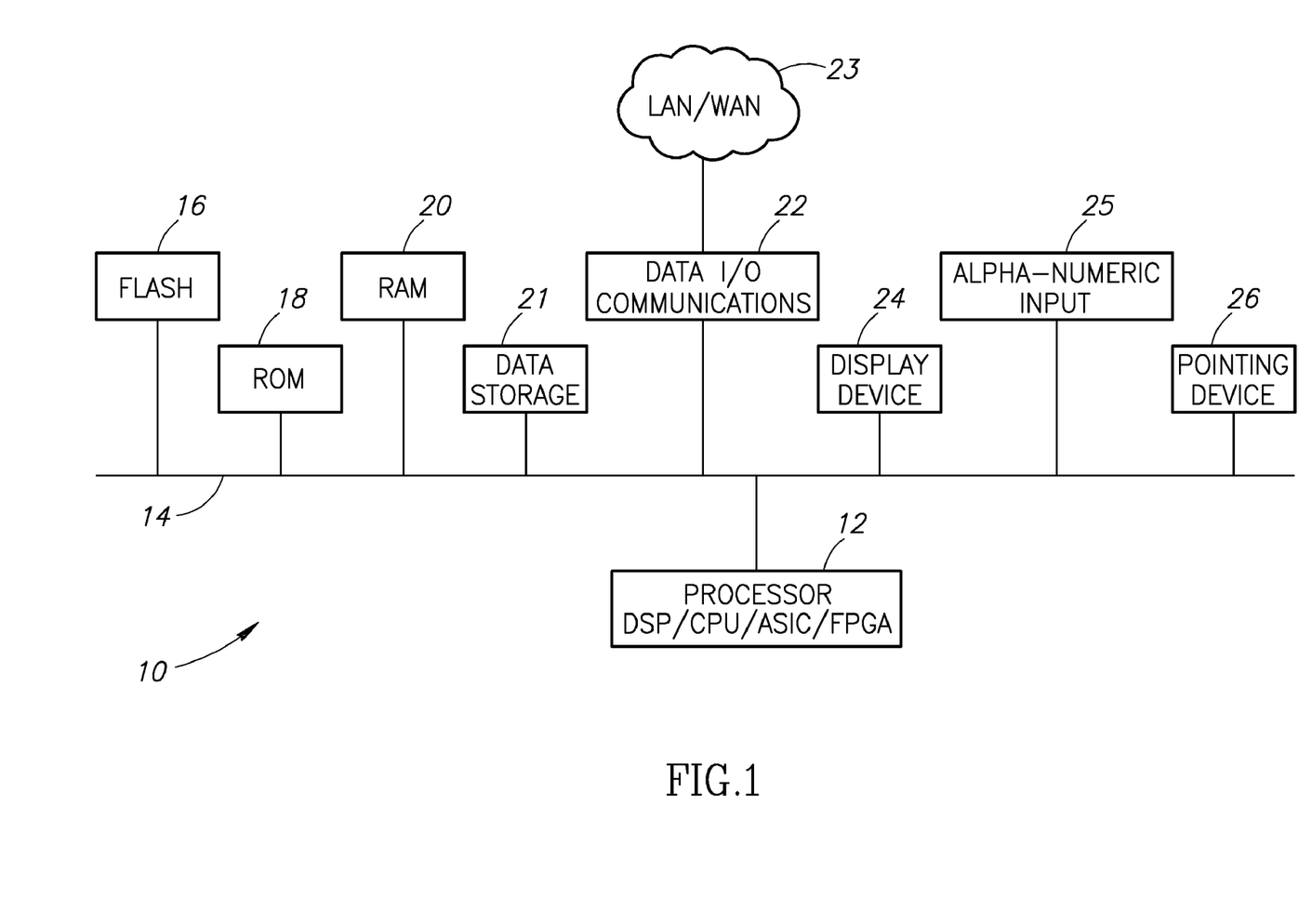
FIG. 1 is a block diagram illustrating an example computer processing system adapted to implement the digital image correction method of the present invention.

A block diagram illustrating an example computer processing system adapted to implement the digital image correction method of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 52 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the digital image correction method of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the digital image correction method of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the complex event processing system rule generation mechanism of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Correcting Digital Image Distortion

In accordance with the invention, a scanned document is registered to a document template, for use in form drop-out and structured documents layout understanding. The present invention includes a method of registering document images which enables robust and accurate mapping of the distortion, thereby making subsequent processing tasks easier and reducing overall document processing error rates.

The method of the present invention stems from the assumption that both feeders of the scanner may advance the paper at different speeds. Assuming that the paper width is constant, the method of the present invention views the scanned document coordinates as a polar transformation of the original (i.e. the image that was scanned) page coordinates. Since the polar transformation parameters are difficult to obtain (the problem is ill-conditioned), the method of the present invention utilizes an approximated model of the problem. If scanning speeds change during the scanning process, a piecewise-polar model is the used (i.e. segmenting the scanned document by scan speeds).

Figure 2:
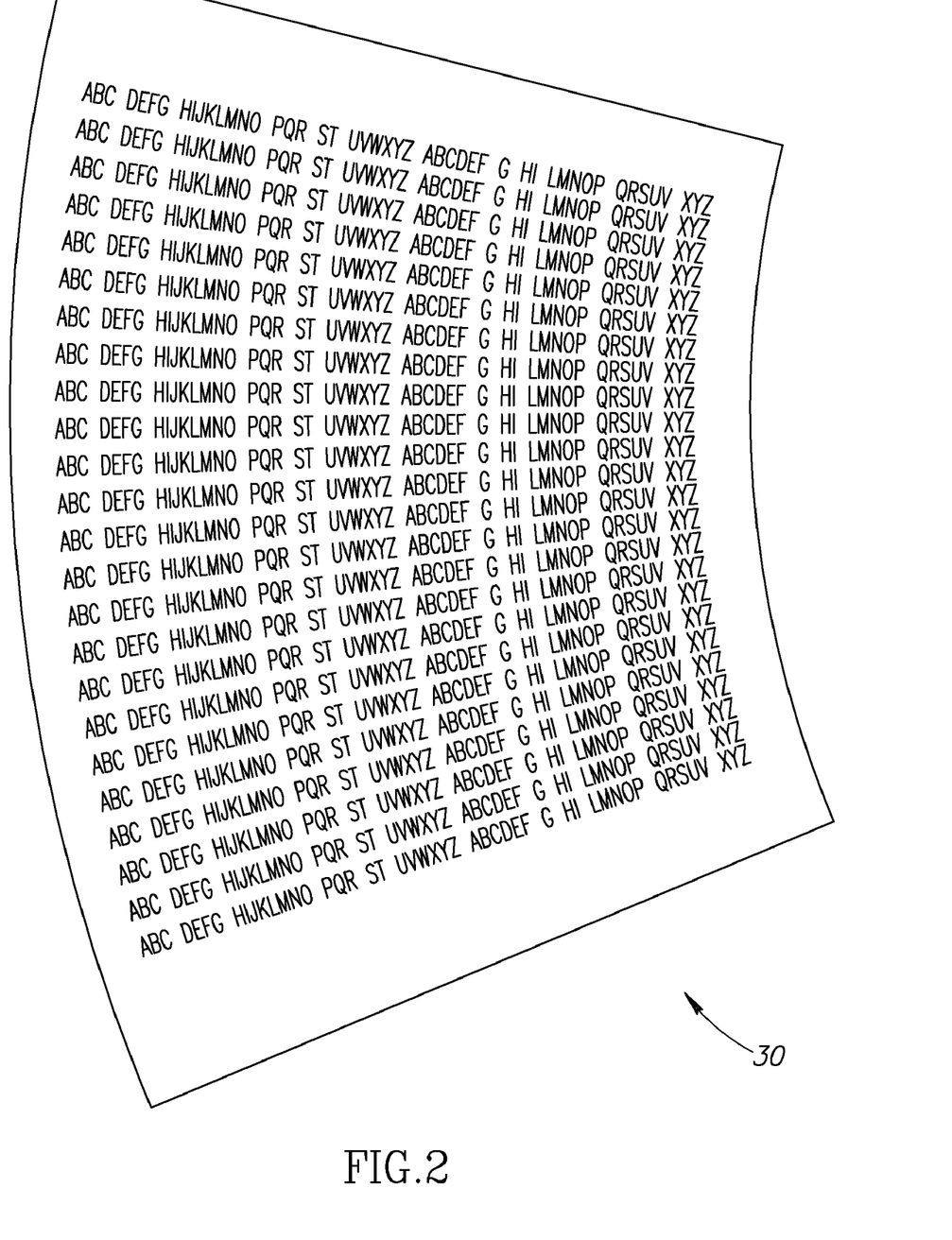
FIG. 2 is a first example of a distorted image to be corrected by the digital image correction method of the present invention.

An example of a scanned image with a single continuous distortion is shown in FIG. 2. The scanned image, generally referenced 30, shows the image distorted by a single polar distortion.

Figure 3:
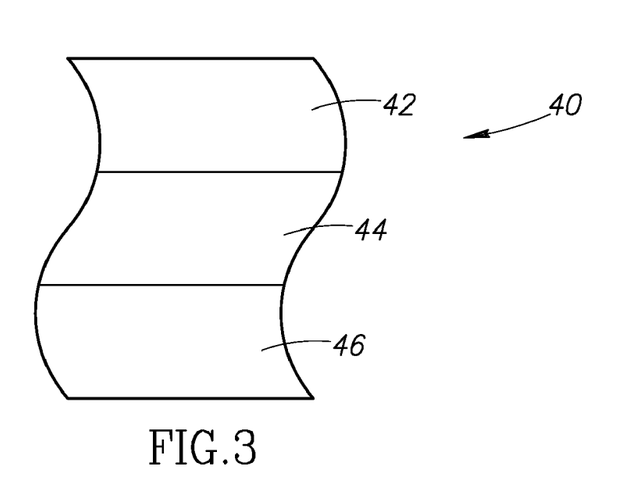
FIG. 3 is a second example of a distorted image to be corrected by the digital image correction method of the present invention.
Figure 4:
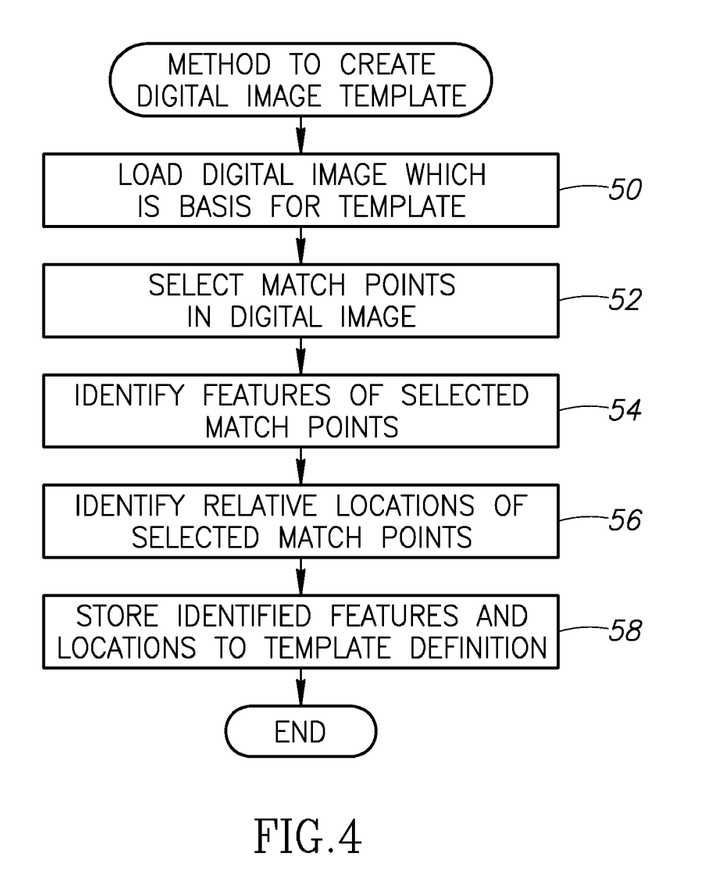
FIG. 4 is a flow diagram illustrating template creation method of the present invention.

An example of a scanned image with multiple distortions is shown in FIG. 3. The scanned image, generally referenced 40, comprises regions 42, 44 and 46, where each region comprises a different (polar) distortion.

To register the digital image, several points of interest which closely match prominent points in the template are detected in the document. A robust consensus process detects correct matches and rules out any outliers from the matching points. The division of the document into regions of varying distortion is done in a coarse to fine manner, balancing the tradeoff between estimation based on a large number of points, and the need to locally adapt to changes in the feeding speed. The resulting compound model can then be used for separation of the template by a drop-out (i.e. from the template), for classification and analysis of document elements and layout or for other analysis tasks.

The model and registration method of the present invention results in a highly accurate template component registration of the document form (i.e. the scanned digital) image, while keeping the registration highly robust to outliers and noise. Suggesting a correct model for the deformation, results in a model with a higher accuracy but fewer parameters. This further results in a larger margin of over-constraining, which enables better handling of noise. The model, with a lower optimum residual error, enables better detection of gross outliers resulting from false matches.

Figure 5:
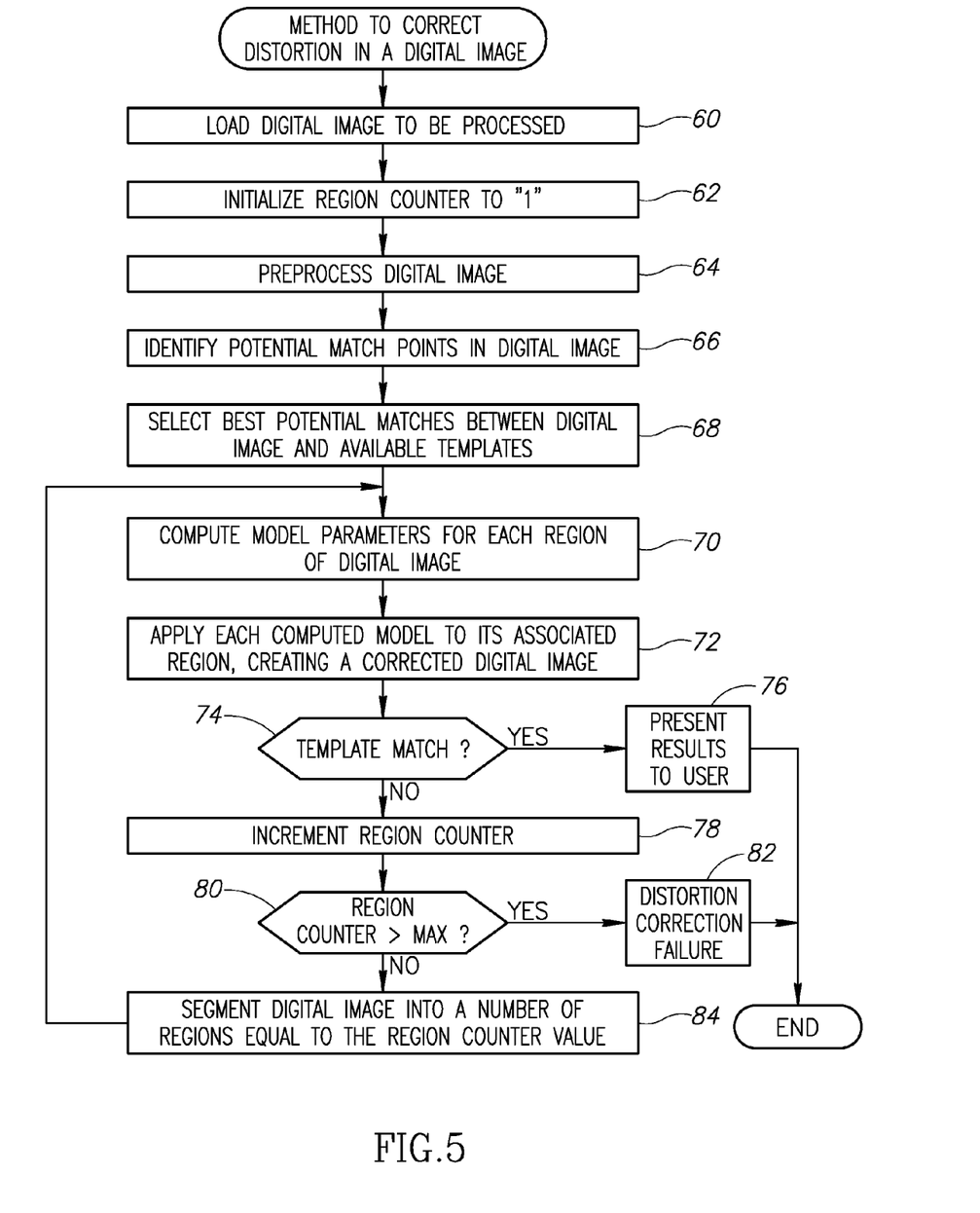
FIG. 5 is a flow diagram illustrating the digital image correction method of the present invention.

A flow diagram illustrating the digital image distortion correction method of the present invention is shown in FIG. 5. First the digital image to be corrected is loaded (step 60) and the region counter is initialized to the value "1" (step 62). The digital image is then preprocessed (step 64). Preprocessing operations include de-noising, segmentation, text extraction and geometric primitive identification. Potential match points are then identified in the digital image (step 66), which includes corner detection, specific keyword detection and affine invariant feature detectors.

Based on the identified match points, potential template matches are selected (step 68). Selection is based on a simplified model for outlier removal, on the model itself or a possible combination of the matching scores for the features themselves (e.g., a combined score relating the geometric error on the image plane and the correlation score). For each region in the digital image, model parameters are computed using the detected match points (step 70). This is performed by either trying to register the points with a quadratic error term or defining robust error norms. The model with the computed parameters is then applied to each region in the digital document (step 72). If the corrected digital image matches a template (step 74) then the corrected digital image is presented to the user (step 76) and the digital image distortion correction method of the present invention completes successfully.

If no match was found then the region counter is incremented (step 78). If the region counter is greater than the maximum region counter value then the digital image could not be corrected (step 82). Otherwise, the digital image is segmented into the number of regions equal to the value stored in the region counter (step 84) and the method of the present invention returns to step 70.

Partitioning the document into regions, and estimating the parameter for use in each of the regions refines the model in an iterative fashion. The estimation may include a smoothness term on the resulting deformation. Refinement should be limited to the case where a large gain in the de-warping accuracy on known match points is obtained, thereby preventing excessive fragmentation of the document. During the refinement, the selected matched points may change, although this is not necessary in practice.

Physically Motivated Model for Image Warping

In one embodiment of the present invention, a transformation model is implemented to approximate the deformations caused by the feeding and scanning process. An assumption is made that the template document is available in an undistorted manner. This is accomplished by either careful scanning of the template document using a flatbed scanner or by processing the template document before using its image.

An assumption is also made that during scanning of the deformed region, the distance along the paper between both tractors remains the same. This stems from the assumption that the paper is inserted while stressed between the two tractors, and remains so without slipping in a direction orthogonal to the scanning direction.

Based on these assumptions, a model similar to the transformation from polar to Cartesian coordinates around some center point is considered. Usually the center point is far from the document area (i.e., the document is only slightly distorted because of the large radius)

$$\begin{pmatrix} \tilde{x}(r,\theta) \\ \tilde{y}(r,\theta) \end{pmatrix} = \begin{pmatrix} x_x \\ y_c \end{pmatrix} + \alpha_r(r - r_c) \begin{pmatrix} \cos(\alpha_\theta(\theta - \theta_c)) \\ \sin(\alpha_\theta(\theta - \theta_c)) \end{pmatrix}$$

The parameters of this model are the center of the polar transformation $\chi_c$, the scales $\alpha_r$, $\alpha_\theta$ of the polar coordinates, and the displacement of the polar coordinates $r_c$, $\theta_c$.

In the asymptotic case where $$\begin{pmatrix} \tilde{x} \\ \tilde{y} \end{pmatrix} = \begin{pmatrix} x_c \\ y_c \end{pmatrix} + \alpha_r(r - r_c) \begin{pmatrix} 1 \\ \alpha_\theta(\theta - \theta_c) \end{pmatrix} = \begin{pmatrix} r \\ \theta \end{pmatrix} \quad (1)$$

the result is $$r_c \to \infty, \alpha_\theta = \frac{-1}{r_c}, \alpha_r = 1, x_c = r_c, y_c = 0, \theta_c = 0,$$

Therefore, as private cases of this model, the identity transformation is known, and in fact, all Euclidean transformations. Given this transformation model, the next step is to attempt to estimate its parameters using least squares. The search for the optimal parameters of this deformation model however is not trivial. Since typical documents have a small distortion, a large radius $r_c$ is required. For an image without any warping, there is $r_c \to \pm\infty$, which is ambiguous. In addition, the problem is ill-conditioned by nature, as can be seen by the condition number of the Hessian matrix of the error function, which reaches $10^6$.

Looking for a model that converges faster, we use the following approximation of the polar model $$T_P\begin{pmatrix} x \\ y \end{pmatrix} = R_\theta S P_{\alpha,\beta}\begin{pmatrix} x \\ y \end{pmatrix} + \begin{pmatrix} \Delta x_c \\ \Delta y_c \end{pmatrix} \quad (2)$$

where $R_\theta$ is the rotation matrix at an angle of $\theta$, S is a matrix scaling both coordinates separately, and $P_{\alpha,\beta}$ operates on (x, y) such that $$P_{\alpha,\beta}\begin{pmatrix} x \\ y \end{pmatrix} = \begin{pmatrix} x(1 + \alpha(y - K)^2) \\ y(1 + \beta x) \end{pmatrix} \quad (3)$$

where K is the center of the parabolic distortion and $\alpha,\beta$ are scale factors for the distortions introduced.

Figure 6:
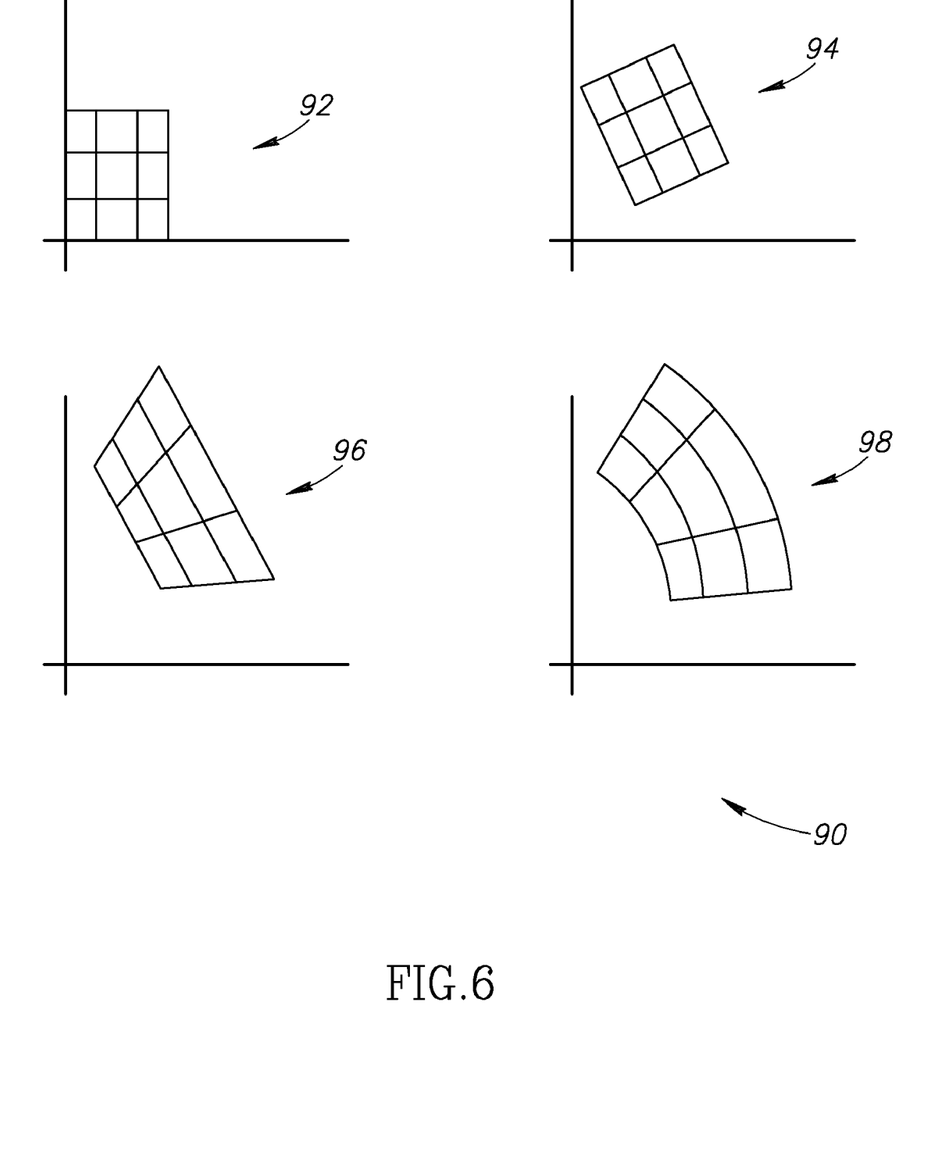
FIG. 6 is a graphical representation of steps involved in transforming a template using the digital image correction method of the present invention.

Thus, this model consists of a Euclidean transformation and scaling, but also allows a trapezoid deformation of the original y axis, and a parabolic deformation of the original x axis. The steps involved in transforming the template are illustrated in FIG. 6. The graphical representations, generally referenced 90, comprise different views of the truncated polar model, in this case shift operation 92, scale operation 94, rotation operation along a trapezoid 96 and parabolic distortion 98.

To see the relation between this model and the polar model of equation (1), analyze the case of a small distortion due to a large radius and small angular proportional factor $$\alpha_r = \frac{1}{r_c}.$$

Using the Taylor series expansion for the trigonometric functions, a model s is obtained which is, up to a redefinition of constants, the same as the model shown in equation (2). This model also handles some of the distortions introduced by the feeding mechanism of the scanner.

Using this new model, we realize a faster rate of convergence. Using a reasonable initial solution, we need only a few conjugate gradients iterations to converge.

Next, we note that in practice, the speed with which the paper advances with respect to the feeder can change during the scan, due to paper elasticity, folds and wrinkles that affect friction, and stains. It is only natural to extend the model into a compound model, consisting of a handful of regions, where each region is modeled separately according to equation (2). We refer to this model as a piecewise polar model. Even when using an arbitrary partition of the page, this model achieves a low error similar to the one exhibited by the triangulation model, while still using several points to approximate the transformation at each region To speed up implementation of this model, we use triangulation based warping using the correspondence points, while using the physical model to ensure a correct displacement value at each of these points. In addition, in order to ensure the triangulation is defined on the whole image domain, virtual points are created at the page boundary, using the physical model to establish the displacement values.

As for detecting the correspondences, this is done in a coarse to fine manner. In the first stage, a feature detector matches a consensus set of correspondences. The physical model is then used for a constrained matching of more features, namely the refinement stage.

The combined usage of triangulation and the physical model mitigates the disadvantages of each method. The exact nature of triangulation is taken advantage of, as well as its low computational cost. By using the physical model three benefits are realized: (1) The robustness to outliers is increased, (2) The risk of foldovers is reduced and (3) The extrapolation can be naturally extended beyond the convex hull of the interpolation points.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of correcting distortion in a digital image, said method comprising the steps of:
   creating, on a computer, a plurality of document templates;
   matching, on said computer, said digital image to one of said document templates;
   identifying, on said computer, one or more segments, wherein each segment comprises a separate distortion event in said distorted digital image;
   computing, on said computer, a formula representing each said separate distortion event; and
   correcting, on said computer, said distorted digital image by applying each said formula to its associated segment.

2. The method according to claim 1, wherein said step of creating a plurality of document templates comprises the steps of:
   collecting a plurality of template digital images; and
   identifying one or more template match points in each said region of each said template digital image.

3. The method according to claim 2, wherein said match points are known.

4. The method according to claim 1, wherein said step of matching said distorted digital image to one of said document templates comprises identifying a plurality of identical match points in both said distorted digital image and one of said document templates.

5. The method according to claim 1, wherein said distortion events are identified by different relative locations of said identical match points in said distorted digital image and said matched document template.

6. The method according to claim 1, wherein said formula representing each said distortion event comprises a polar transformation, wherein the coordinates said match points in said distorted digital image are a polar transformation of the coordinates of said match points in said matched document template.

7. The method according to claim 1, wherein said corrected digital image comprises a plurality of match points in similar relative proximity to said match points of said matched document template.

8. A method of creating a document template from a digital image, said method comprising the steps of:
   obtaining, on a computer, a digital image to be processed;
   selecting one or more match points for said document template, wherein said match points are represented in polar coordinates;
   identifying, on said computer, a plurality of unique features of said selected match points;
   determining, on said computer, the relative location of each selected match point with respect to other selected match points; and
   storing, on said computer, identified features and locations of said selected match points in a document template definition.

9. The method according to claim 8, wherein said unique components are known.

10. A method of matching a document template to a distorted digital image, said method comprising the steps of:
    creating, on a computer, a plurality of document templates;
    associating, on said computer, said distorted digital image to one of said document templates;
    identifying, on said computer, one or more segments in said distorted digital image, wherein each segment comprises a separate distortion event;
    establishing, on said computer, one or more segments in said associated document template, wherein each established segment corresponds to an identified segment in said distorted digital image;
    computing, on said computer, a formula representing each said distortion event; and
    distorting, on said computer, said associated document template by applying each said formula to its corresponding segment in said associated document template.

11. The method according to claim 10, wherein said step of creating a plurality of document templates comprises the steps of:
    collecting a plurality of template digital images; and
    identifying one or more template match points in each said region of each said template digital image.

12. The method according to claim 11, wherein said match points are known.

13. The method according to claim 10, wherein said step of matching said document template to said distorted digital image comprises identifying a plurality of identical match points in both said distorted digital image and said associated document template.

14. The method according to claim 10, wherein said distortion events are identified by different relative locations of said identical match points in said distorted digital image and said associated document template.

15. The method according to claim 10, wherein said formula representing each said distortion event comprises a polar transformation, wherein the coordinates said match points in said distorted digital image are a polar transformation of the coordinates of said match points in said associated document template.

16. The method according to claim 10, wherein said distorted associated document template comprises a plurality of match points in similar relative proximity to said match points of said distorted digital image.

17. A computer program product of correcting distortion in a digital image, the computer program product comprising:
a non-transitory, tangible computer readable medium having computer usable code embodied therewith, the computer program product comprising:
computer usable code configured for creating a plurality of document templates;
computer usable code configured for matching said digital image to one of said document templates;
computer usable code configured for identifying one or more segments, wherein each segment comprises a separate distortion events in said distorted digital image;
computer usable code configured for computing a formula representing each said separate distortion event; and
computer usable code configured for correcting said distorted digital image by applying each said formula to its associated segment.

18. The computer program product according to claim 17, wherein said computer usable code configured for creating a plurality of document templates comprises:
computer usable code configured for collecting a plurality of template digital images
computer usable code configured for identifying one or more template match points in each said region of each said template digital image.

19. The computer program product according to claim 18, wherein said match points are known.

20. The computer program product according to claim 17, wherein said computer usable code configured for matching said distorted digital image to one of said document templates comprises identifying a plurality of identical match points in both said distorted digital image and one of said document templates.

21. The computer program product according to claim 17, wherein said distortion events are identified by different relative locations of said identical match points in said distorted image and said matched document template.

22. The computer program product according to claim 17, wherein said formula representing each said distortion event comprises a polar transformation, wherein the coordinates said match points in said distorted digital image are a polar transformation of the coordinates of said match points in said matched document template.

23. The computer program product according to claim 17, wherein said corrected digital image comprises a plurality of match points in similar relative proximity to said match points of said matched document template.

24. The method according to claim 1, wherein said formula comprises a smoothness term on the resulting deformation between segments.

25. The method according to claim 10, wherein said formula comprises a smoothness term on the resulting deformation between segments.

\* \* \* \* \*